United States Patent [19]
Corcoran

[11] 3,820,037
[45] June 25, 1974

[54] LASER CONTROL SYSTEM
[75] Inventor: Vincent J. Corcoran, Orlando, Fla.
[73] Assignee: Martin Marietta Corporation, New York, N.Y.
[22] Filed: Sept. 25, 1972
[21] Appl. No.: 291,844

[52] U.S. Cl............................................ 331/94.5 C
[51] Int. Cl............................................. H01s 3/02
[58] Field of Search................................. 331/94.5

[56] References Cited
UNITED STATES PATENTS
| 3,389,348 | 6/1968 | De Maria........................... | 331/94.5 |
| 3,523,718 | 8/1970 | Crow................................. | 331/94.5 |
| 3,614,462 | 10/1971 | Lean et al......................... | 331/94.5 |

Primary Examiner—William L. Sikes
Attorney, Agent, or Firm—Julian C. Renfro; Gay Chin

[57] ABSTRACT

A laser beam provided by a laser oscillator is transmitted along a path so as to be intercepted and amplified by a laser amplifier. A portion of the laser beam may be reflected as a feedback signal to the oscillator and cause oscillator pulling. To prevent such unwanted feedback, an acousto-optical isolator is interposed between the amplifier and the oscillator which causes the laser beam to be frequency shifted each time it passes through the isolator. The frequency shift is sufficient that the laser beam feedback signal arrives at the oscillator shifted in frequency by an amount to minimize oscillator pulling.

5 Claims, 3 Drawing Figures

PATENTED JUN 25 1974 3,820,037

LASER CONTROL SYSTEM

BACKGROUND OF THE INVENTION

This invention relates to the art of lasers and more particularly, to the control of a generated laser beam.

The invention is particularly applicable for use in conjunction with gas laser oscillators and amplifiers operating in the infrared region, and will be described with particular reference thereto; although, it is to be appreciated that the invention may be applied to laser systems operating at various levels throughout the frequency spectrum, and that the oscillator and/or amplifier may be other than gas operated.

There are numerous applications where it is desired to amplify the radiation emitted from a low power laser oscillator. This is achieved by positioning a laser amplifier so as to receive and amplify the laser beam. However, a portion of the received laser beam is reflected or fed back to the oscillator where it interacts with the emitted laser radiation. This results in frequency pulling of the oscillator, thereby degrading the output signal. Consequently, the operation of the laser system is rendered unreliable.

Techniques to achieve feedback isolation to minimize frequency pulling of a laser oscillator are known. These include, for example, the use of a simple germanium polarizer, an indium antimonide Faraday rotator, or a quarter-wave plate. These techniques, however, have exhibited unsatisfactory performance, particularly in the infrared region of the frequency spectrum. For example, in the infrared region discernable Faraday rotation effects require cryogenic cooling of the material. Consequently, a need is presented for an effective feedback isolator operable in the infrared region at room temperatures while withstanding high input power densities.

SUMMARY OF THE INVENTION

It is therefore a specific object of the present invention to provide a feedback isolator to prevent amplifier feedback from frequency pulling a laser oscillator.

It is a still further object of the present invention to provide an isolator which is operable at room temperatures in the infrared region to effectively isolate a laser oscillator from laser amplifier feedback.

It is a still further object of the present invention to provide a feedback isolator particularly applicable for operation at room temperatures in the infrared region while withstanding high input power densities.

A further object of the present invention is to provide an isolator for preventing frequency pulling of a low power, stable oscillator by laser amplifier feedback while at the same time exhibiting a low absorption coefficient.

In accordance with one aspect of the present invention, a laser beam is generated by an oscillator and is transmitted along an optical path from one end thereof. A laser amplifier is positioned so as to receive the transmitted laser beam. A portion of the laser beam may be reflected back toward the transmitting end of the oscillator. To prevent frequency pulling of the oscillator by the feedback signal, an acousto-optic modulator is interposed between the oscillator and the amplifier. The modulator is excited so as to provide an acoustic signal at a modulation frequency and which travels substantially transverse to the direction of the laser beam. This causes the laser beam to be shifted in frequency by the magnitude of the modulation frequency each time it passes through the acoustic modulator and thereby minimize the tendency fo the feedback signal to interact with the radiation emitted from the oscillator.

Still further in accordance with the present invention, the modulating frequency is on the order of at least one-half of the gain transition band width of the laser oscillator so that the twice frequency shifted laser beam will not effectively interact with the generated laser beam.

The foregoing and other objects and advantages will become more readily apparent from the following description of the preferred embodiment of the invention as taken in conjunction with the accompanying drawings which are a part hereof and wherein.

DESCRIPTION OF THE PREFERRED EMBODIMENT

Figure 1:
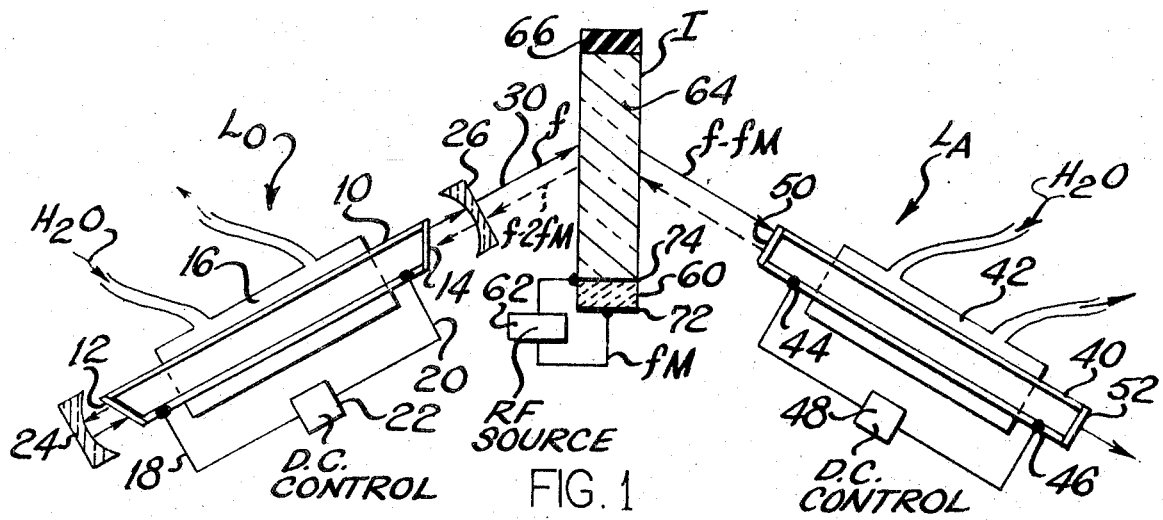
FIG. 1 is a schematic illustration of the laser control system constructed in accordance with the present invention.

Referring now to the drawings wherein the showings are for purposes of illustrating a preferred embodiment of the invention only and not for purposes of limiting same, FIG. 1 illustrates a laser oscillator LO and a laser amplifier LA having a feedback isolator I interposed therebetween.

The laser oscillator LO may take various forms, such as a solid state laser generator, a liquid laser generator or a gas laser generator. For purposes of illustration herein, the laser generator. For purposes of illustration herein, the laser oscillator LO takes the form of a continuous wave, frequency stabilized, carbon dioxide laser oscillator. The oscillator includes a gas laser tube 10 which is sealed and filled with a mixture of helium, nitrogen and carbon dioxide. Tube 10 is provided, at its opposite ends, with Brewster windows 12 and 14. As is well known, the Brewster windows may be constructed from a number of materials, including gallium arsenide, cadmium telluride, or sodium chloride. A water jacket 16 is schematically illustrated as surrounding a portion of tube 10 for purposes of cooling the gas discharge region. The gas discharge region is excited by means of a pair of conventional electrodes 18 and 20, in the discharge region, and which are powered by a regulated DC power supply source 22. Preferably, current control is employed by the power supply to reduce fluctuation in current which may cause frequency instabilities.

The laser cavity is completed in a conventional fashion including a rear mirror 24 and a forward mirror 26, respectively spaced from the Brewster windows 12 and 14. As is conventional, the rear mirror 24 is a total reflector whereas mirror 26 is a partial or transmitting mirror so that radiation may be emitted therefrom along a path 30. The enclosure surrounding the laser cavity may be isolated from the surrounding environment by mechanical means, such as pneumatic tubes and by acoustic means, such as with the use of acoustical insulation inside the enclosure. Such isolation will enhance the stability of the laser oscillator. Whereas the gas laser tube 10 is illustrated as being a sealed tube, it may take the form of a flowing gas system well known in the art. Also, if desired, the rear mirror 24 may be replaced by a grating to facilitate selection of the desired laser frequency. A piezoelectric translator may be interposed between the reflector mirror and the gas tube for purposes of adjusting the separation therebetween to effect fine tuning of the laser frequency.

The laser amplifier LA employs a gas discharge tube 30 which is constructed in a manner quite similar to that of gas discharge tube 10 in the oscillator LO. Thus, the gas discharge tube 40 may be filled with a mixture of helium, nitrogen and carbon dioxide for optimizing the gain of the cell. Tube 40 may be provided with a conventional water jacket 42 through which water is flowed to cool the discharge region. The discharge tube is provided with electrodes 44 and 46 driven by a DC power supply 48 for purposes of exciting the discharge region. The entrance and exit windows 50 and 52 of the gas discharge tube may be flat with anti-reflection coatings, as shown in the drawing, or may be Brewster windows. The windows may be constructed of a suitable material such as gallium arsenide, cadmium telluride or sodium chloride.

There are numerous laser applications wherein a low power stable oscillator, such as oscillator LO, and a co-operating laser amplifier, such as amplifier LA, are employed. The amplifier LA could be aligned so that its entrance window 50 would receive the radiation emitted along path 30 from the oscillator LO. A portion of the received radiation may be reflected back from window 50 so as to enter the laser cavity of the oscillator through mirror 26. Consequently, the feedback from the amplifier would interact with the emitted radiation from the laser cavity causing frequency pulling of the oscillator. This, of course, will degrade the laser output signal. If is desirable to isolate the oscillator from the amplifier feedback to prevent frequency pulling.

In accordance with the present invention, an acous-to-optic isolator I is interposed between the laser oscillator LO and the laser amplifier LA. As will be developed in greater detail hereinafter, the isolator serves to shift the frequency of the laser beam each time it passes through the isolator so that the feedback signal from the amplifier is at a frequency outside of the gain transition of the laser oscillator to prevent frequency pulling. The isolator I includes a piezoelectric transducer 60 driven by a radio frequency source 62 for purposes of propagating an acoustic wave through an acoustic medium 64 along a path which is transverse to the path of the laser beam. An acoustical attenuator 66, which may be constructed of radiation absorption material, such as felt or styrofoam, is provided on the other end of the isolator. The piezoelectric transducer 60 may be made with any suitable piezoelectric material, such as, for example, lithium niobate, PZT, or quartz. As is conventional, electrodes 72 and 74 are secured to the front and back surfaces of the transducer and are driven by the radio frequency source 62. The transducer may be secured in any suitable fashion to the acoustic medium 64, such as by an epoxy or indium bond. The transducer 62 is cut in such a manner and is of a thickness to effectively couple energy from the driver to the transducer to emit the acoustical waves.

Although the length and cross section of the medium may be arbitrary, it is preferred that the cross section of medium 64 be such that the optical aperture is sufficient to interact with all of the incoming radiation. When operating in the Bragg region, then the dimension of medium 64 along which the beam travels should be long enough to satisfy the well known Bragg condition, namely $2\pi\lambda l >> \Lambda^2$ where $\lambda$ is the light wavelength, $l$ is the length of the interaction, and $\Lambda$ is the wavelength of the acoustical wave in the medium. The transducer 62 may be any size, however, it is customary to make its cross section large compared to the desired aperture but slightly smaller than the cross section of the transducer medium so that the optical wave sees essentially a plane acoustical wave and so that effects from the walls of the medium are reduced.

The acoustic medium 64 may take various forms including solid or liquid mediums. In the embodiment illustrated, the acoustic medium 64 is of a single crystal germanium material. This material exhibits a low absorption coefficient ($0.032 cm^{-1}$). Consequently, germanium is a suitable material for 10 micron radiation and can withstand high input power densities.

In operation, the laser oscillator LO emits single frequency, dominant mode radiation in the infrared region along path 30 so as to be intercepted by isolator I. As the radiation passes through the isolator medium 64 it interacts with the acoustic wave which causes a change in the frequency of the laser beam and deflects it. The deflected beam, as it leaves the acoustic medium, is frequency shifted by the frequency $F_M$ of the acoustic wave. Consequently, the deflected radiation at frequency $F-F_M$ is passed on to the laser amplifier LA. A portion of the radiation received at entrance window 50 is reflected back and passes through the isolator I. Here, the laser beam is again shifted in frequency by frequency $F_M$ so that the feedback radiation is twice shifted by the frequency $F_M$. Whereas the drawings have illustrated the change in frequency as being from frequency $F$ to frequency $F-2F_M$ the geometry may cause the opposite results, i.e., the return signal may exhibit a frequency of $F+2F_M$.

The angular and frequency effects described above are, of course, the effects of an acousto-optic interaction in the Bragg region. As is well known, when the interaction of a light wave with an acoustic wave occurs in the Bragg region, the conservation of energy and momentum must occur. The conservation of energy is equivalent to the requirement that the output frequency, after the interaction occurs, must be equal to the sum or difference of the optical input and the acoustical input. As a result, the output optical wave can be shifted either up or down in frequency. The requirement of conservation of momentum implies that the vectors of the input waves must add or subtract in such a way as to equal the output wave. It is due to this requirement that the output wave is deflected in space relative to the optical wave input to the acousto-optic device. As has been mentioned, FIG. 1 depicts the situation where the frequency shift is downward and the angular relationship between the vectors is as shown. The vector relationship required for the situation in which there is an upward shift in frequency of the optical signal can be deduced by requiring the optical input vector and the acoustical vector to add in such a manner as to equal the output optical vector. This relationship can be found in any text dealing in detail with acousto-optical interactions.

Figure 2:
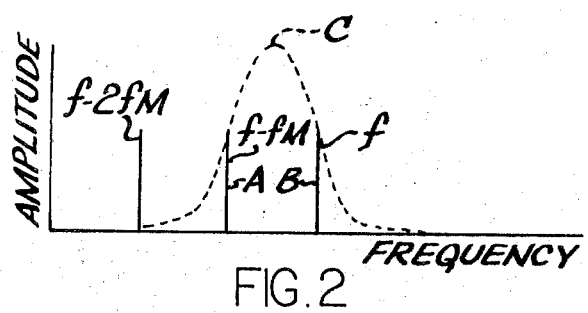
FIG. 2 is a graphical illustration of laser radiation intensity versus frequency; and, FIG. 3 is a schematic illustration showing the acousto-optical isolator of the present invention.
Figure 3:
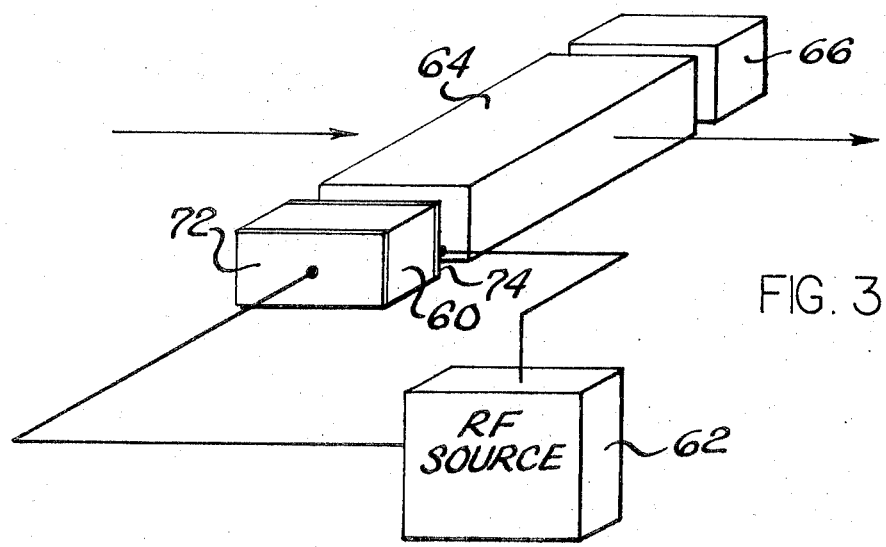

The modulating frequency $F_M$ is chosen so that when the laser frequency is shifted by twice that amount, the feedback radiation will be outside of the gain transition of the oscillator, as is shown in FIG. 2. If the gain transition be on the order of 50 $MH_z$, between points A and B, then the modulating frequency $F_M$ should preferably be on the same order. This will ensure that the frequency of the feedback signal will be outside of the gain transition. If the frequency of oscillator LO is centered at C in the gain transition, of FIG. 2, then with a gain transition of 50 $MH_z$ essentially the same results as before may be accomplished if the modulating frequency $F_M$ be on the order of 26 $MH_z$. By ensuring that the feedback radiation is shifted in frequency to the point that it is outside the gain transition, the returned radiation is effectively not seen by the gas discharge region of the laser oscillator LO and, hence, does not interact with the laser radiation being emitted from the oscillator. Consequently, frequency pulling of the laser oscillator by feedback radiation from the laser amplifier is minimized by the insertion of the isolator I.

Whereas the embodiment of the invention illustrated herein has been described with reference to gas lasers and a solid acoustic medium for isolator I, the invention is not limited to such construction. For example, the acoustic medium 64 may take the form of water through which an ultrasonic wave is propagated by means of a suitable piezoelectric transducer, in a known manner. The two laser tubes 10 and 40 may be both gas lasers; although, not necessarily carbon dioxide lasers as described herein. If gas lasers be desired, other gas may be employed, such as for example hydrogen cyanide, carbon monoxide, or iodine. Also, if desired, the gas laser tubes may be replaced with solid state or liquid devices. In addition, the oscillator and amplifier need not employ the same laser material. They may be different gas lasers or different solid or liquid lasers. Also, one of the lasers may be of one type material, such as a gas laser, and the other may be of another type of material, such as solid state. For example, the oscillator may take the form of a 1.06 micron injection laser and the laser amplifier may be a solid state amplifier employing, for example, a neodymium doped material.

Whereas the invention has been described with respect to a preferred embodiment it is to be appreciated that the invention is not limited thereto as various modifications in addition to those discussed above may be made without departing from the spirit and scope of the invention as defined by the appended claims.

What is claimed is:

1. A laser beam control system comprising:
laser oscillator means generating a laser beam at a frequency F falling within a desired gain transition band extending from frequency $F_1$ to frequency $F_2$;

laser amplifier means for receiving and amplifying said laser beam while reflecting at least a portion of said beam back toward said oscillator means;

acousto-optic modulating means interposed between said oscillator means and said amplifying means for intercepting transmitted and reflected laser beams, and including means for acoustically exciting said modulating means to generate an acoustic signal and consequently an acoustic wave at a modulating frequency $F_M$ along a direction extending substantially transverse to the paths of said transmitted and reflected laser beams so that both the transmitted and reflected laser beams are frequency modulated by said modulating frequency $F_M$, said modulating frequency $F_M$ being on the order of at least one-half $(F_1 - F_2)$ so that said feedback laser beam exhibits a frequency which is substantially at or outside of the end points of said frequency band so as to not effectively interact with and degrade the output of said oscillator means.

2. A laser beam control system comprising:
laser oscillator means generating a laser beam at a frequency F falling within a desired gain transition extending from frequency $F_1$ to frequency $F_2$;

laser amplifier means for receiving and amplifying said laser beam while reflecting at least a portion of said beam back toward said oscillator means;

acousto-optic modulating means interposed between said oscillator means and said amplifying means for interceptng transmitted and reflected laser beams, and including means for acoustically exciting said modulating means to generate an acoustic signal and consequently an acoustic wave at a modulating frequency $F_M$ along a direction extending substantially transverse to the paths of said transmitted and reflected laser beams so that both the transmitted and reflected laser beams are frequency modulated by said modulating frequency $F_M$, said modulating frequency $F_M$ being greater than one-half the difference between frequencies $F_1$ and $F_2$ so that the twice modulated feed-back laser beam exhibits a frequency outside of the desired frequency band to thereby minimize frequency pulling of said oscillator means by said feedback laser beam.

3. A laser beam control system comprising:
laser oscillator means for generating a laser beam at a frequency F and including a resonant cavity defined between a pair of end reflectors of which is a partial reflector for transmitting said beam in a forward direction from said oscillator means, laser amplifier means positioned to receive said transmitted light beam and including means for reflecting a portion of said light beam as a feedback signal toward said partial reflector, and modulating frequency generating means for shifting the frequency of said feedback signal by an amount equal to at least the bandwidth of the gain transition at the frequency F, so that the frequency shifted feedback signal will not effectively interact with the radiation emitted from the oscillator means to cause frequency pulling of said oscillator means.

4. A laser control system as set forth in claim 3, wherein said frequency shifting means includes acousto-optic modulator means positioned to intercept said feedback signal and means for generating an acoustic signal and consequently an acoustic wave traveling along a path transverse to said laser feedback signal at a modulating frequency $F_M$ so that the laser feedback signal is frequency shifted feedback signal will not effectively interact with the radiation emitted from the oscillator means to cause frequency pulling of said oscillator means.

5. A laser control system as set forth in claim 4, wherein said modulator means is interposed in the optical path between said oscillator means and said amplifier means such that said laser beam is shifted in frequency by said modulating frequency $F_M$ each time it passes through said modulator means so that the feedback signal to said oscillator means is shifted by a frequency equal to twice that of said modulating frequency so as to be outside of the gain transition of said oscillator means.

* * * * *